United States Patent [19]
Neff

[11] 3,822,798
[45] July 9, 1974

[54] TRAILER FOR MOTORCYCLES

[76] Inventor: Wayne W. Neff, 679 Vine Ave. NE, Warren, Ohio 44482

[22] Filed: Dec. 13, 1972

[21] Appl. No.: 314,859

[52] U.S. Cl................ 214/85, 280/150.5, 296/1 A, 296/23 R
[51] Int. Cl.............................................. B60p 3/06
[58] Field of Search...... 296/1 A, 10, 3, 24 R, 23 R; 224/42.03 B; 214/85, 450; 280/106 T, 150.5

[56] References Cited
UNITED STATES PATENTS

| | | | |
|---|---|---|---|
| 1,223,258 | 4/1917 | Cooper | 224/42.03 B |
| 1,280,141 | 10/1918 | Bonner | 296/1 A |
| 1,871,828 | 8/1932 | Van Vorst | 296/24 R X |
| 2,038,932 | 4/1936 | Haupt | 296/24 R |
| 2,256,038 | 9/1941 | Woodruff | 280/106 T |
| 2,576,222 | 11/1951 | Hill | 224/42.03 B |

*Primary Examiner*—David Schonberg
*Assistant Examiner*—John A. Pekar
*Attorney, Agent, or Firm*—Michael Williams

[57] ABSTRACT

A trailer to be towed by a draft vehicle, such as an automobile. The trailer comprises a frame having wheel means depending therefrom and adapted to roll along a roadway. A container is supported on the frame and is adapted to contain camping gear, parts, tools and the like. Tracks are carried by the frame and disposed on opposite sides of the container, each track being aligned with the towed direction of the trailer and adapted to receive the front and back wheels of a motorcycle. The forward end of each track has a stirrup for receiving the front wheel of a motorcycle, and the rear end of each track has a ramp portion that may be swung to an upright position to abut against the rear wheel of the motorcycle.

9 Claims, 8 Drawing Figures

TRAILER FOR MOTORCYCLES

BACKGROUND AND SUMMARY

Motorcycle trailers are known in the prior art but, insofar as is known, these trailers are merely platforms upon which one or a plurality of motorcycles are supported. Some of the prior art trailers have tracks for receiving the wheels of the motorcycle, but provide a very unstable mount for the same.

My invention provides a trailer frame and wheel means depending from the frame and adapted to roll along a roadway. A container is supported on the frame and is useful to carry gear normally needed by the cycle rider. A motorcycle is mounted on each side of the container in a fashion to provide a lower center of gravity than is provided in the prior art, thus enhancing the stability of the trailer.

My improved trailer provides a mount for a pair of motorcycles wherein the latter are easily mounted on or removed from the trailer. Thus persons who enjoy trail riding, and yet do not want to drive a motorcycle through heavy traffic, may load a pair of motorcycles on the improved trailer and drive to the countryside to ride along trails in the open country. The pair of motorcycles are mounted in balanced condition on opposite sides of a box-like container and thus my invention not only makes provision for transporting the motorcycles, but also makes provision for gear normally needed by a trail rider.

DESCRIPTION OF THE DRAWINGS

In the drawings accompanying this specification and forming a part of this application, there is shown, for purpose of illustration, an embodiment which my invention may assume, and in these drawings.

DESCRIPTION OF PREFERRED EMBODIMENT

My improved trailer comprises a frame 10, wheel means 11 depending from the frame and adapted to roll along a roadway, and a container 12 supported on and connected to the frame.

Figure 5:
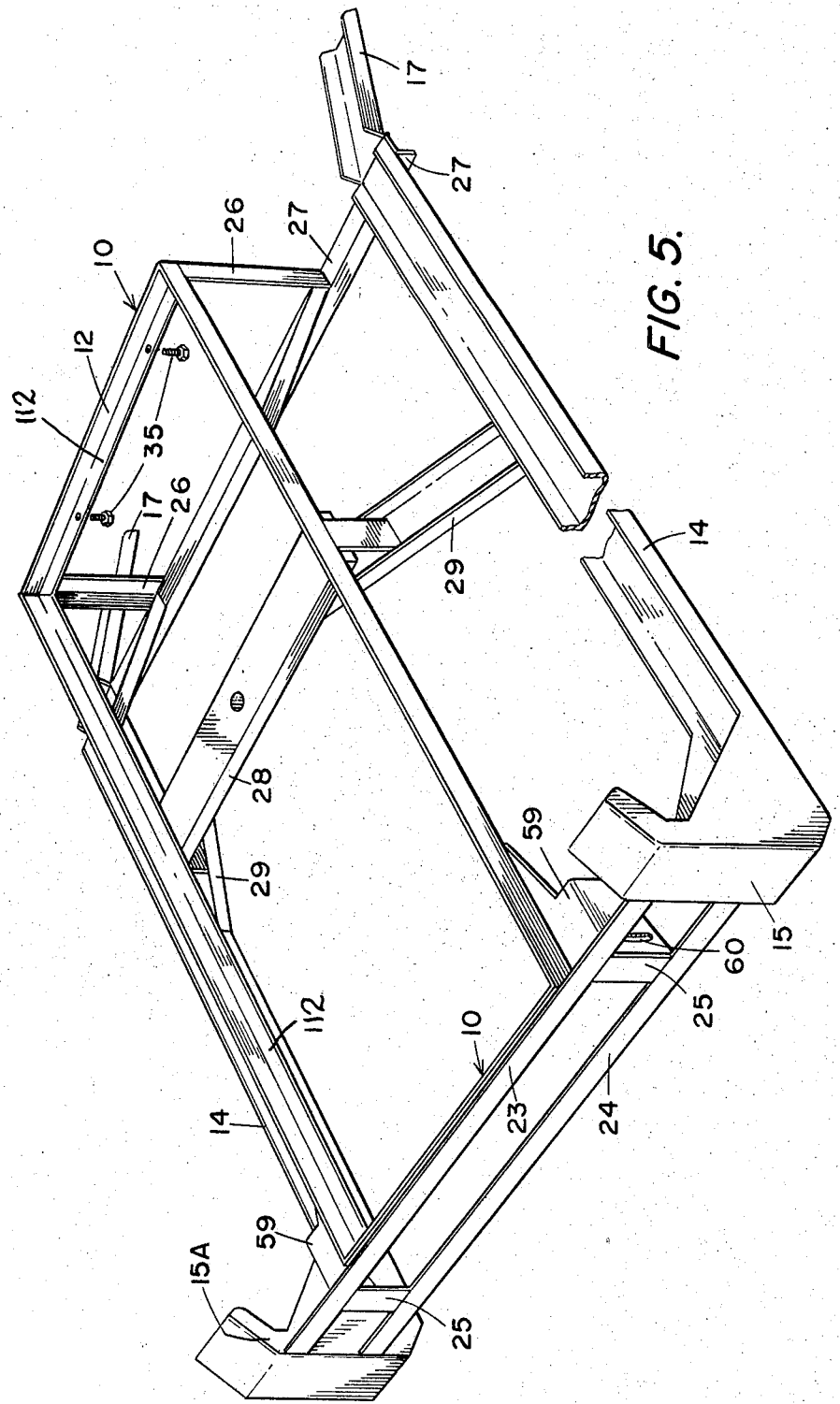
FIG. 5 is a fragmentary perspective view of the frame of the trailer, with container detached.

The frame 10 may be of any suitable construction and FIG. 5 illustrates one form which the frame may assume. As shown, the upper portion of the frame comprises metal angles welded to each other to provide a rectangular formation. The horizontal legs of the angles are turned inwardly to form a horizontal ledge 112 upon which the container 12 rests and to which it is connected.

Identical tracks 14—14 are supported on opposite sides of the frame to extend longitudinally from the front of the frame to the rear. Each track is channel-shaped in cross-section from the rear thereof and forwardly to stirrups 15 formed at the front. Each stirrup is also channel-shaped in cross-section and provides a substantial pocket for receiving a portion of the rubber tire of the front wheel 16 (see FIG. 2) of a motorcycle M. The upper channel-shaped part of each stirrup is angled rearwardly to overlie an upper portion of the front wheel tire and thereby restrain the latter against upward movement.

Figure 1:
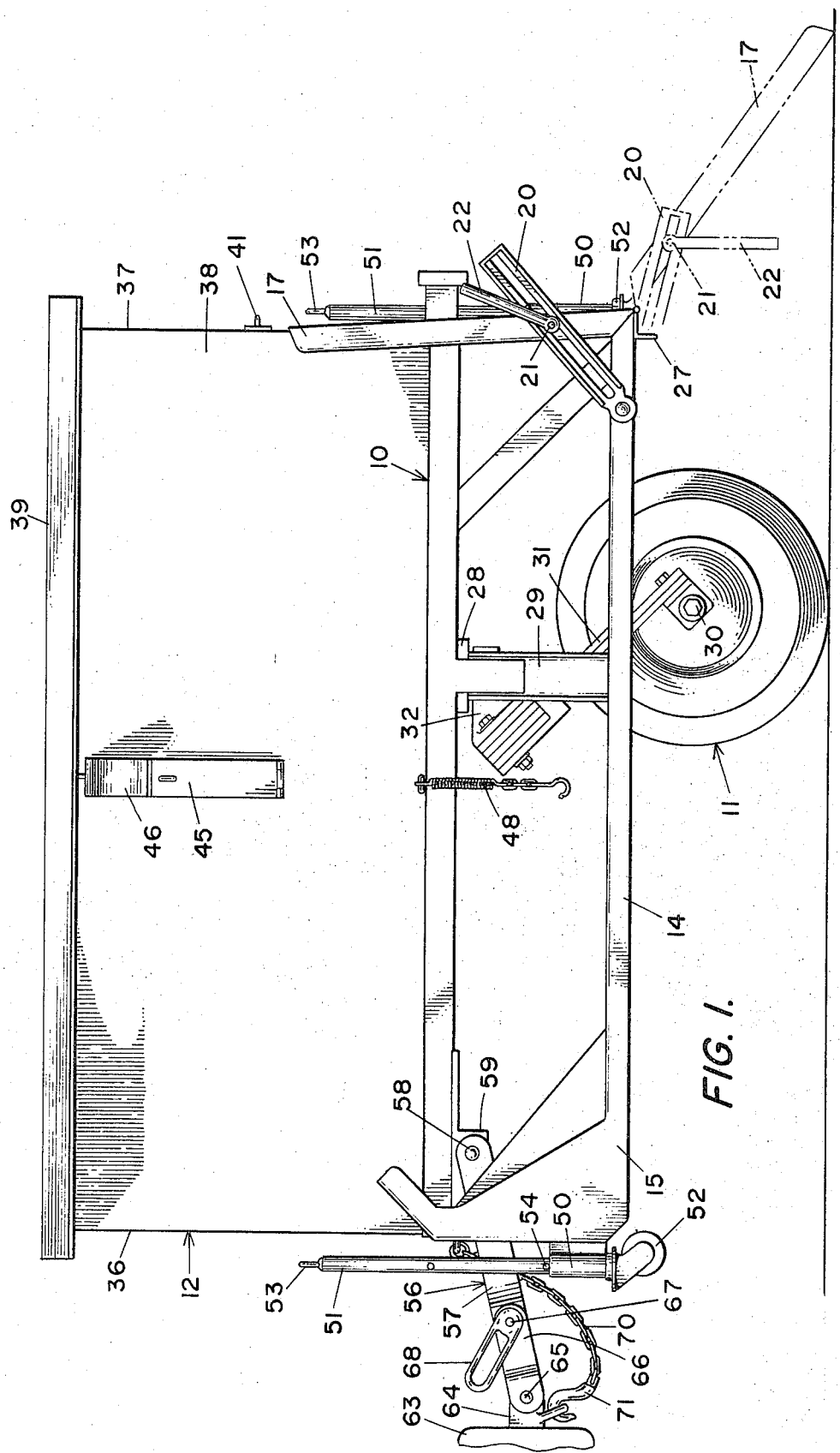
FIG. 1 is a side view of my improved trailer, with motorcycles removed, and showing the trailer hitched to the back end of a draft vehicle, such as an automobile.

A track extension 17 is pivoted to the rear of each track 14 and is of the same channel shape. Each track extension 17 may be swung downwardly (as seen in dot-dash lines in FIG. 1) so that the free end will rest on the roadway. In this position the track extension forms a downwardly angled continuation of the respective track 14, so that the wheels of a motorcycle may be rolled upwardly on the track extension and onto the track 14. After a motorcycle has been rolled onto its track, the respective track extension may be rotated to the upright position shown in FIG. 2 (and in full lines in FIG. 1). In its upper position, the track extension is angled slightly forwardly to restrain the rear wheel of the motor cycle against upward movement. The tracks 14, the stirrups 15, and the track extensions 17, being of channel cross-section, embrace peripheral portions of the tires of the front and rear wheels of the respective motorcycles and thus restrain them against sidewise movement. One end of a slotted lever 20 is pivoted to the track 14 and a bolt 21 carried by the respective track section 17 is disposed within the slot of the lever. A handle nut 22 is threaded on the bolt 21 and retains the track section in any of its adjusted positions.

An angle iron 23 overlaps the frame angle at the front of the frame (see especially FIG. 5) and a similar angle iron 24 is disposed below the angle 23. Cross pieces 25 are welded between the angles 23,24 to brace them. The opposite ends of angles 23,24 are welded to the inner wall 15a of each stirrup 15 to support the tracks 14 at their forward ends. Angle iron legs 26 extend downwardly at the rear of the frame and support a cross angle iron 27. The rear end of each track 14 rests upon, and is welded to opposite ends of the angle 27.

Figure 6:
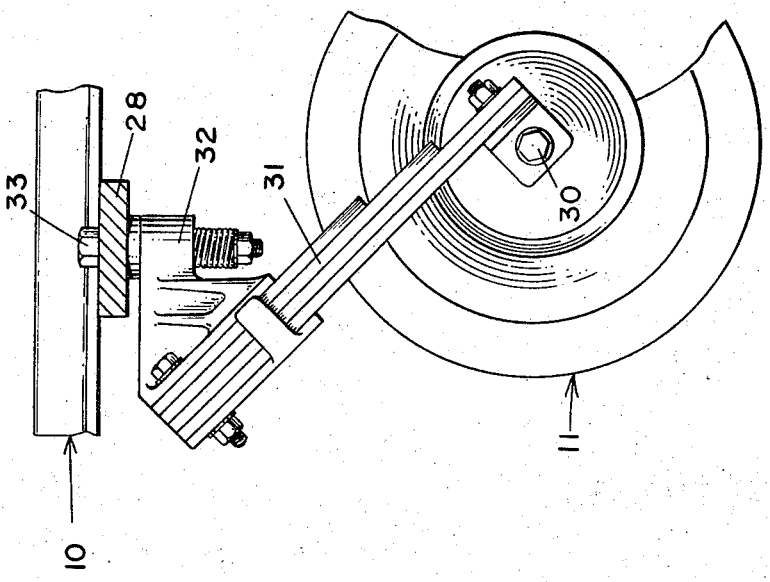
FIG. 6 is a fragmentary view showing the wheel suspension.

A cross bar 28 is welded across the frame, and stub channels 29 are welded between the frame and the intermediate portion of each track 14, to provide further support for the same. The cross bar 28 provides support for the wheel means 11 and in the disclosed embodiment a single wheel has been found suitable. As best seen in FIG. 6, the wheel axle 30 is supported at the lower end of a leaf spring 31, the upper end of the latter being held in a bracket 32 which has a vertical pivot connection 33 with the cross bar 28 so that the wheel may caster and thus follow the draft vehicle around curves.

The container 12 rests on the horizontal ledge 112 formed by the rectangularly connected angle irons and may be detachably but firmly, connected thereto, in any suitable manner. One type of connection may comprise bolts 35 (see FIG. 5) which pass through holes in the horizontal ledge 112 and thread into nuts carried by the floor of the container.

Figure 3:
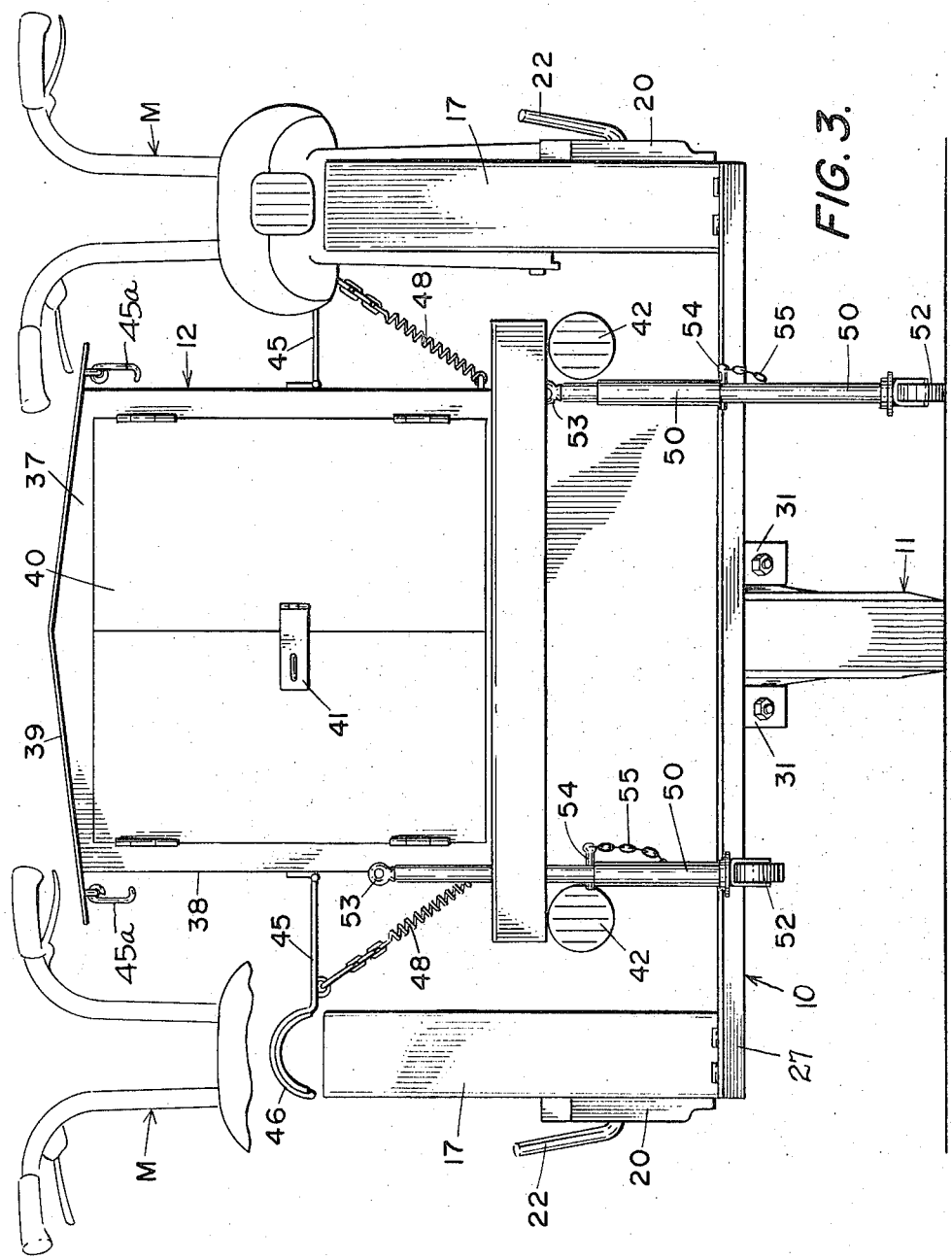
FIG. 3 is a view of the trailer, looking at the rear end thereof.
Figure 4:
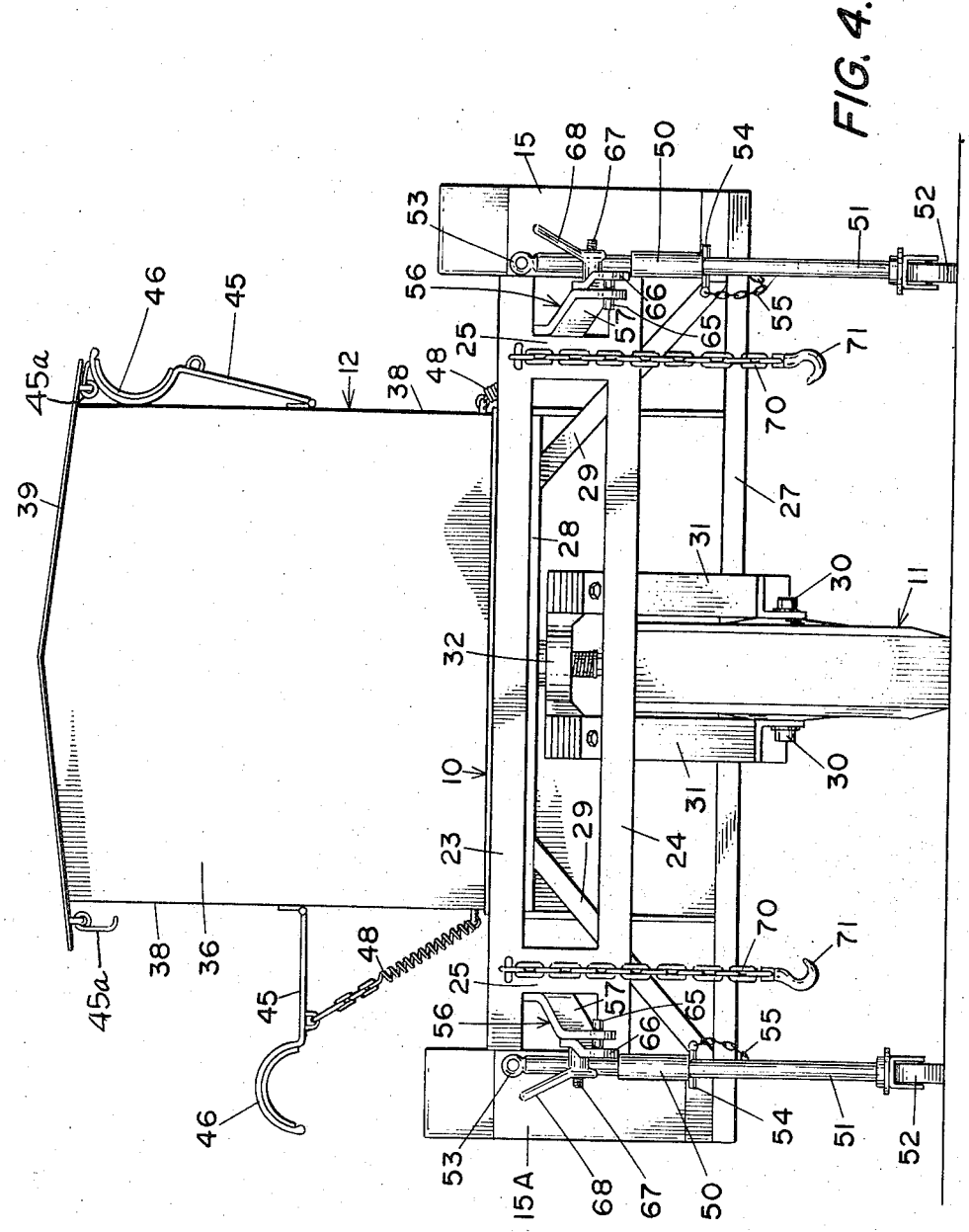
FIG. 4 is a view of the trailer, looking at the front end thereof.

The container may be formed of any suitable material, such as wood or metal sheets and is rectangular in plan to fit within the rectangular opening of the frame. In the disclosed embodiment, the container is box-like in shape and has front and rear walls 36,37 opposite sidewalls 38, a bottom wall (not shown) and a roof 39 which, as seen in FIGS. 3 and 4, inclines downwardly from the longitudinal center to prevent rain or snow from accumulating thereon. The roof slightly overhangs the front, rear and side walls. A door 40 is provided in the rear wall of the container to provide access to the interior thereof, and a hasp 41 or other means may be provided to lock the door. As seen in FIG. 3, tail lights 42 may be carried by the rear portion of the frame, for safety purposes.

Figure 2:
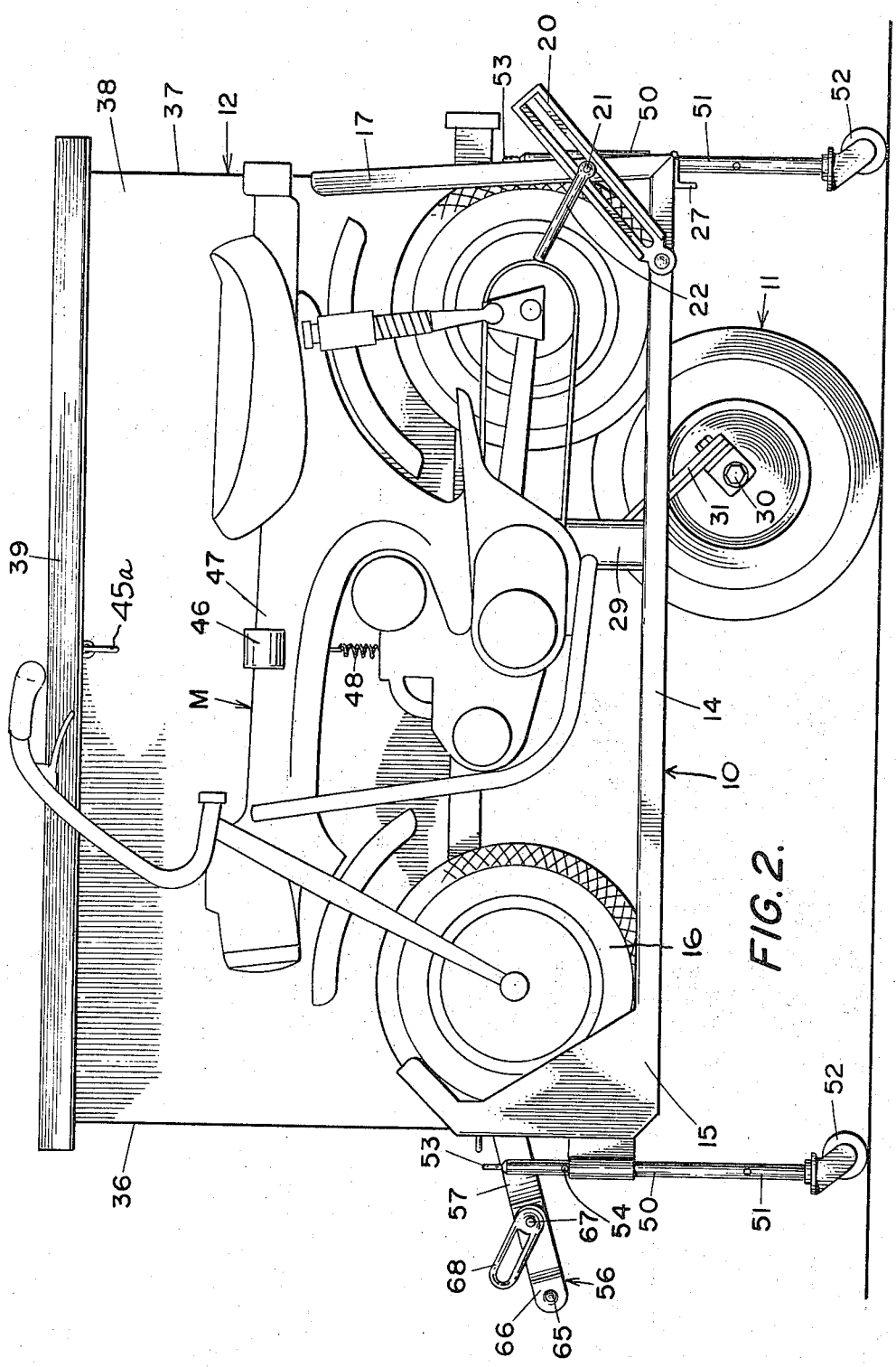
FIG. 2 is a view similar to FIG. 1, showing one of the pair of motorcycles mounted on the trailer.

Clamps are connected to the opposite sides 38 of the container and in the disclosed embodiment comprise sheet metal arms 45 having one end pivotally connected to a container side and a free end 46 which is curved to fit over a belly portion 47 of the motorcycle, as seen in FIG. 2. The end 46 may have a soft lining so as not to mar the finish of the belly portion. A coil spring 48 has one end attached to the container side and its free end provided with a hook to engage within a loop carried by a metal arm. The springs 48 pull the respective arms downwardly and inwardly and firmly hold each motorcycle in its respective track 14. When the clamps 45 are not in use, they may be firmly held against the side 38 of the container by clips 45a (as seen on the right hand side of FIG. 4) which are pivotally connected to the overhang of the roof 39.

Provision is made to stabilize the trailer when it is disconnected from the draft vehicle and, as seen in FIGS. 1 through 4, two vertically disposed sleeves 50 are welded to the front and back of the frame 10 adjacent to the corners thereof. Vertically slidably within each sleeve is a rod 51 which carries a small caster wheel 52 at its lower end. A finger loop 53 is formed at the upper end of each rod so that the latter may be pulled to an upper position (see left hand rods shown in FIG. 3) wherein the caster wheel 52 is lifted free of the roadway. A cross pin 54 (see FIG. 3) is carried by a chain 55 connected to a respective sleeve 50 and is adapted to fit within either one of two cross holes in the rod 51 to firmly hold the latter in its upper or lower position.

With all rods in their lower position, the four caster wheels engage the roadway and combine with the single center wheel to provide a stable support for the trailer. Thus, when disconnected from the draft vehicle the trailer may be moved to and from a storage place, with or without the motorcycles carried thereon.

Figure 7:
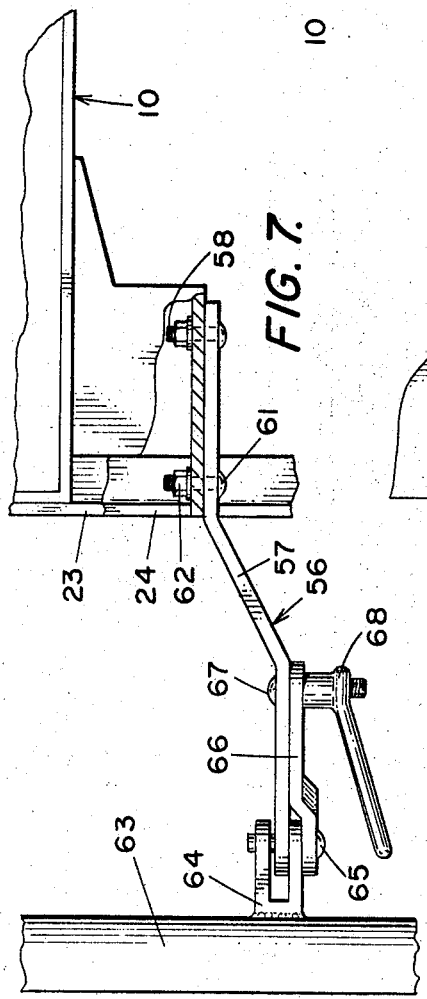
FIG. 7 is a fragmentary plan view of a trailer hitch used to couple the trailer to the rear of a draft vehicle.
Figure 8:
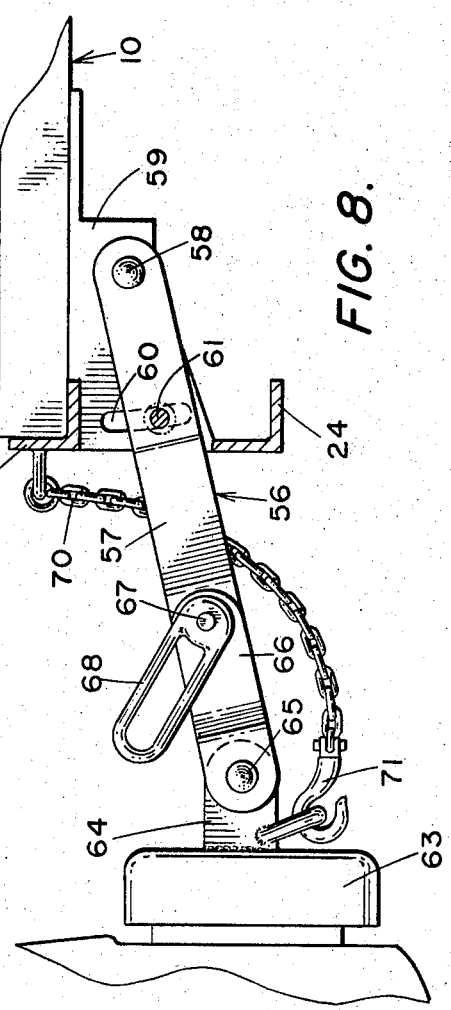
FIG. 8 is a fragmentary side view of the trailer hitch.

Connected to the front side of the frame 10, in spaced relation as seen in FIG. 4, are two similar trailer hitches 56 for connecting the trailer to the rear of a draft vehicle. As seen in FIGS. 7 and 8, each hitch 56 comprises a relatively heavy metal bar 57 having one end pivotally connected, at 58, to a lug 59 welded to and extending from the frame 10. The lug 59 has an arcuate slot 60 formed in a wall thereof, and a bolt 61 carried by the bar 57 passes through the slot. A nut 62 threaded on the bolt 61 releasably holds the bar 57 in a selected angular position to compensate for varying heights between the trailer and the bumper 63 of the draft vehicle.

The bumper 63 has a pair of bifurcated brackets 64 rigidly connected thereto, as by welding, and the free end of each bar 57 has a pivotal connection with a respective bracket. The pivot connection is made by a headed pin 65 carried by an offset portion of a plate 66, and the latter is clamped against the bar 57 by a threaded stud 67 and a hand-lever nut 68. When the nut 68 is removed from the stud 67, the plate 66 may be removed from the bar and in doing this, the pin 65 is withdrawn from the bracket 64. Thus, the hitch is disconnected from the draft vehicle.

In the interest of safety, a chain 70 is connected to the frame 10 adjacent to the connection of each hitch, and the chain has a hook 71 which may be engaged in a hole in the bracket 64. Thus, if any part of the hitch should fail, the chain would still hold the trailer at the rear of the draft vehicle.

I claim:
1. A trailer for a motorcycle comprising:
   a vehicle frame having roadway wheel means thereon and hitch means for connecting said trailer to a towing vehicle,
   a container mounted upon said frame and extending generally longitudinally thereof for receiving camping gear, repair parts, tools and the like,
   an elongated track extending generally longitudinally of said frame adjacent said container for receiving a motorcycle thereon with the wheels of said motorcycle on said track,
   said container on the side thereof adjacent said track having means thereon for detachably clamping said motorcycle on said track, and
   said track including portions for restraining said motorcycle wheels against fore and aft, and up and down movement as said trailer is towed.

2. The construction according to claim 1 wherein said container is box-like in shape and has an access door in the rear side.

3. The construction according to claim 1 wherein a plurality of caster wheels are supported in depending relation from said trailer vehicle frame, the support for said caster wheels providing for extension of the latter to engagement with the roadway to steady the trailer for movement independent of the draft vehicle, said support providing for retraction of said caster wheels clear of the roadway during towing of the trailer.

4. The trailer of claim 1 wherein said restraining means includes forward and rear terminal track portions inclined upwardly and inwardly toward a motorcycle on said track.

5. The trailer of claim 1 wherein said track includes means restraining the motorcycle wheels against lateral movement.

6. The trailer of claim 1 wherein a second said track is provided on said frame adjacent another side of said container, and a second said clamping means is associated therewith.

7. The trailer of claim 1 wherein said restraining means includes a terminal track portion inclined upwardly and inwardly toward a motorcycle on said track.

8. The trailer of claim 7 wherein said track portion is pivoted to said track for adjustment to load, unload, or accommodate motorcycles of varying size on said track, and means releasably securing said track portion in an adjusted position.

9. The trailer of claim 8 wherein said track portion is mounted for pivotal movement between said upwardly and inwardly inclined position to a downwardly and outwardly inclined position engaging the ground, thereby to define in said latter position a loading and unloading ramp for said motorcycle.

* * * * *